US012028950B1

(12) United States Patent
Cox et al.

(10) Patent No.: US 12,028,950 B1
(45) Date of Patent: Jul. 2, 2024

(54) I/O DEVICE LIGHTING TECHNIQUES FOR ASSOCIATED DEVICE SELECTION

(71) Applicant: Dell Products L.P., Round Rock, TX (US)

(72) Inventors: Tyler Ryan Cox, Austin, TX (US); Erik Summa, Austin, TX (US); Jason Scott Morrison, Chadron, NE (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/150,606

(22) Filed: Jan. 5, 2023

(51) Int. Cl.
| | |
|---|---|
| *H05B 47/105* | (2020.01) |
| *A63F 13/23* | (2014.01) |
| *G06F 13/20* | (2006.01) |
| *G06F 16/903* | (2019.01) |
| *G06K 19/07* | (2006.01) |
| *H05B 47/165* | (2020.01) |

(52) U.S. Cl.
CPC ........... *H05B 47/105* (2020.01); *A63F 13/23* (2014.09); *G06F 13/20* (2013.01); *G06F 16/90335* (2019.01); *G06K 19/0723* (2013.01); *H05B 47/165* (2020.01)

(58) Field of Classification Search
None
See application file for complete search history.

(56) References Cited

U.S. PATENT DOCUMENTS

| | | | | |
|---|---|---|---|---|
| 6,402,616 B1* | 6/2002 | Ogata | ..................... | A63F 13/23 |
| | | | | 345/170 |
| 2006/0170376 A1* | 8/2006 | Piepgras | .............. | H05B 47/105 |
| | | | | 315/295 |
| 2007/0188318 A1* | 8/2007 | Cole | ..................... | G06Q 10/08 |
| | | | | 340/572.1 |
| 2014/0143676 A1* | 5/2014 | Tan | ......................... | G06F 9/451 |
| | | | | 715/744 |
| 2020/0114253 A1* | 4/2020 | Maruyama | .............. | A63F 13/54 |
| 2021/0082229 A1* | 3/2021 | Meyer | ..................... | A63F 13/23 |
| 2021/0263600 A1* | 8/2021 | Starrett | ............... | G06F 3/04845 |
| 2021/0267028 A1* | 8/2021 | Starrett | ................. | G06F 3/0202 |
| 2021/0400142 A1* | 12/2021 | Jorasch | ................. | H04M 3/567 |
| 2022/0277611 A1* | 9/2022 | Winston | ............. | G07F 17/3213 |

* cited by examiner

*Primary Examiner* — Wilson Lee
(74) *Attorney, Agent, or Firm* — Norton Rose Fulbright US LLP

(57) ABSTRACT

Systems and methods described herein may provide a system that enables game play or other application sessions from a set of candidate game hosts and environments to consumption devices of a user's choice while the user moves about their home between the different environments. The system may employ methods to determine where a user is located within the home, availability and selection of candidate game hosting and target environments, homing and direction of related I/O and audio-visual (AV) content for consumption. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device.

20 Claims, 9 Drawing Sheets

I/O DEVICE LIGHTING TECHNIQUES FOR ASSOCIATED DEVICE SELECTION

FIELD OF THE DISCLOSURE

The instant disclosure relates to information handling systems. More specifically, portions of this disclosure relate to lighting systems and technique for selecting between associated devices for use with I/O devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously.

The mobility of a user between services and applications for executing an application session may be supported by an information handling system that uses available telemetry from multiple sources to build a confidence-based knowledge graph of the user's gaming environments and determine a position of the user within that graph. A system with knowledge of devices in a user's gaming environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is sitting in front a device. An intelligent system may assemble these individual pieces of telemetry into a broader knowledge graph based on the absolute and/or relative locations of the user's devices, the location of the user in relation, and/or characteristics of the devices. This knowledge graph may be updated in real time and/or based on changes in device telemetry.

According to one embodiment, a method for execution by an information handling system, such as a hub device, includes detecting a position change for an I/O device. The method also includes determining, based on a current position of the I/O device, one or more nearby computing devices capable of communicating with the I/O device. The method also includes determining a first lighting pattern based on positions of the one or more nearby computing devices relative to the I/O device. The method also includes displaying the first lighting pattern on an exterior lighting device of the I/O device.

In certain aspects, determining the one or more nearby computing devices may include querying a database for a plurality of computing devices capable of communicating with the I/O device; and identifying, from among the plurality of computing devices, the one or more computing devices as being located near the I/O device.

In certain aspects, the first lighting pattern includes at least one illuminated portion directed towards the one or more nearby computing devices.

In certain aspects, the method is repeated to update the first lighting pattern as the I/O device moves to keep the at least one illuminated portion directed towards the one or more nearby computing devices.

In certain aspects, the method further includes receiving a request to add a location tag corresponding to a second computing device; receiving position calibration information for the I/O device corresponding to a display of the second computing device; determining, based on the position calibration information, a position offset for the location tag relative to the display of the second computing device; and storing the position offset with an identifier of the second computing device.

In certain aspects, determining the one or more nearby computing devices may include determining a plurality of computing devices capable of communicating with the I/O device, where determining the first lighting pattern may include determining, based on positions for the plurality of computing devices, a plurality of lighting patterns, where the plurality of computing devices includes the one or more nearby computing devices, and where the plurality of lighting patterns includes the first lighting pattern.

In certain aspects, the current position is determined based on a distance between the I/O device and a plurality of location tags. In certain aspects, at least a subset of the plurality of location tags are ultra-wide band tags.

In certain aspects, detecting the position change for the I/O device may include: determining that the current position of the I/O device has changed by more than a predetermined threshold.

In certain aspects, the I/O device is a gaming controller and the one or more nearby computing devices is a gaming device.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
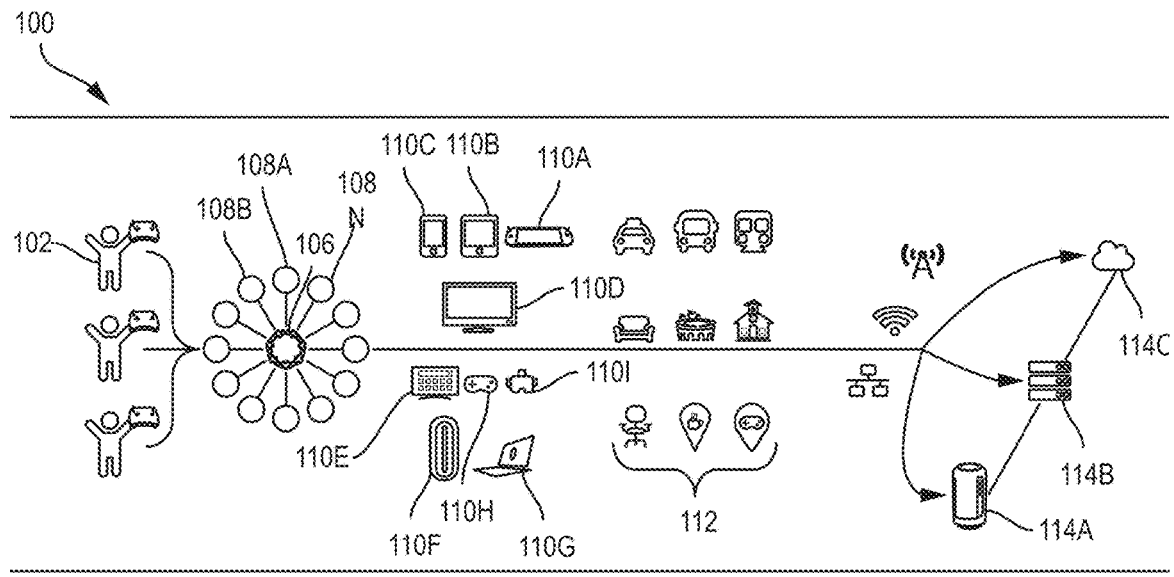
FIG. 1 is a block diagram illustrating aspects of a configurable system for providing services to users according to some embodiments of the disclosure.

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

The user's home may be divided into different environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the communication link from the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game or other application requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application sessions for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen, gaming controller and/or a video display. The information handling system may also include one or more buses operable to transmit communications between the various hardware components.

FIG. 1 is a block diagram illustrating aspects of a configurable system for providing services to users according some embodiments of the disclosure. A system 100 includes users 102 who may have access to a shared library of applications 106 including applications 108A-108N. The users 102 may have separate libraries, with some overlapping applications between the libraries. The users 102 may access the library through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

Figure 2:
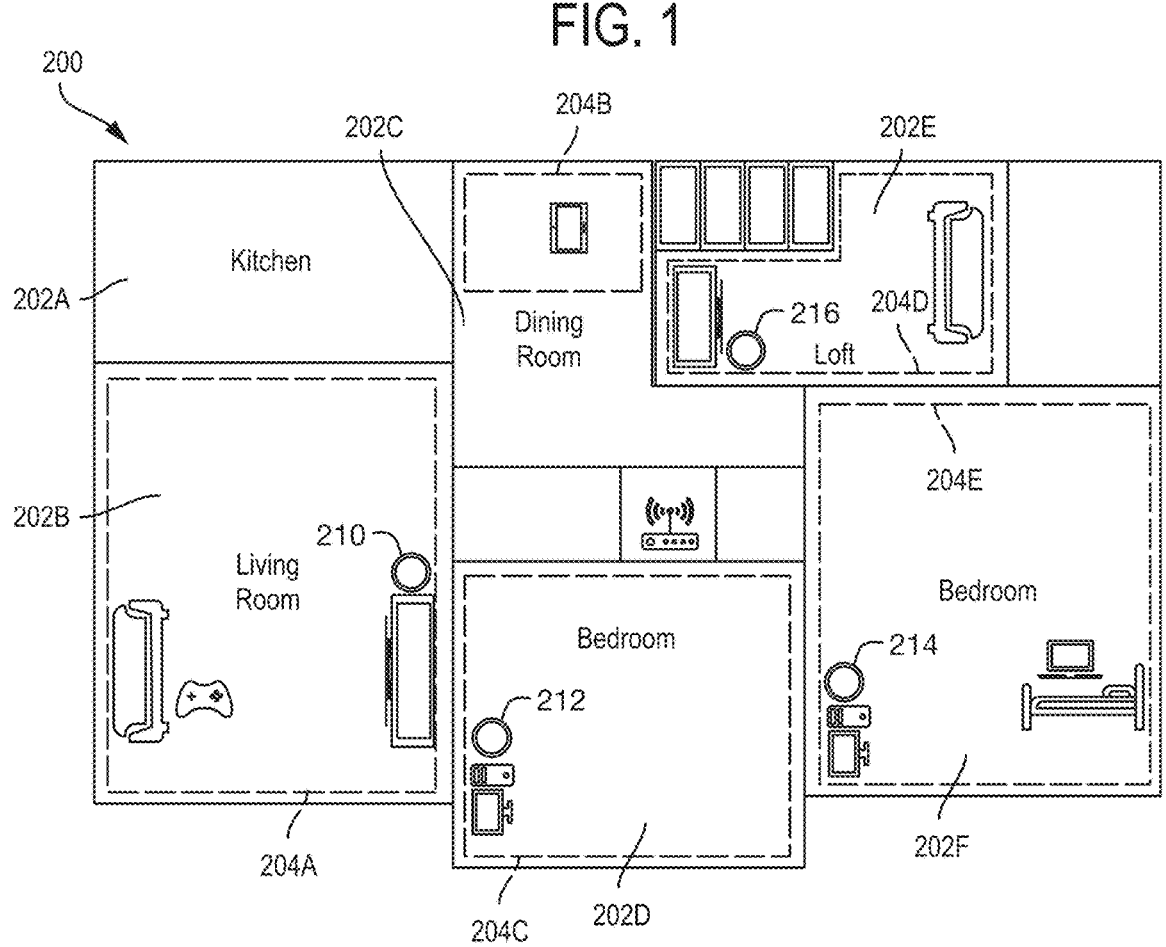
FIG. 2 is a block diagram illustrating possible game environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session. In some embodiments, multiple games may be hosted on a single device. In some embodiments, multiple games may target a single output device. In some embodiments, an application or other computing services manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
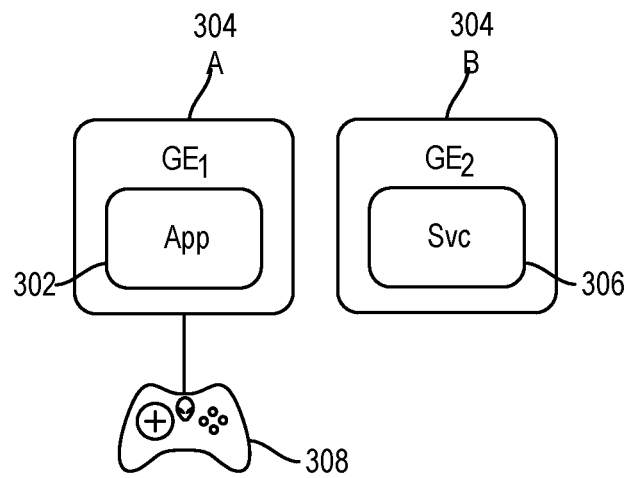
FIG. 3A is a block diagram illustrating application and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
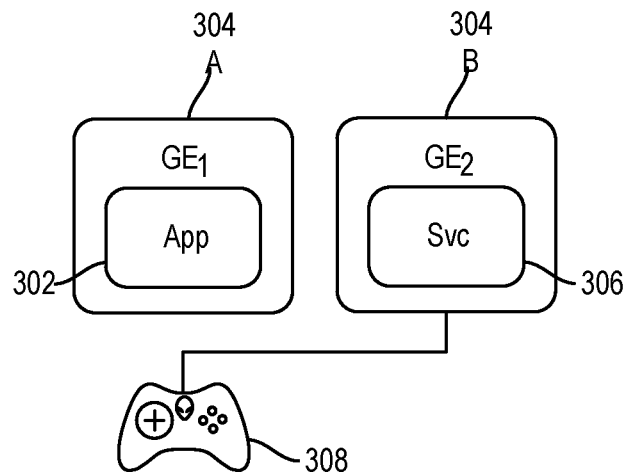
FIG. 3B is a block diagram illustrating application and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
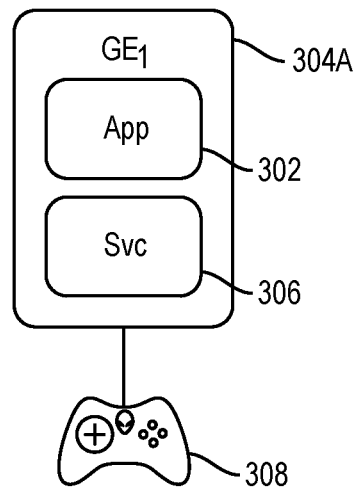
FIG. 3C is a block diagram illustrating application and service hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
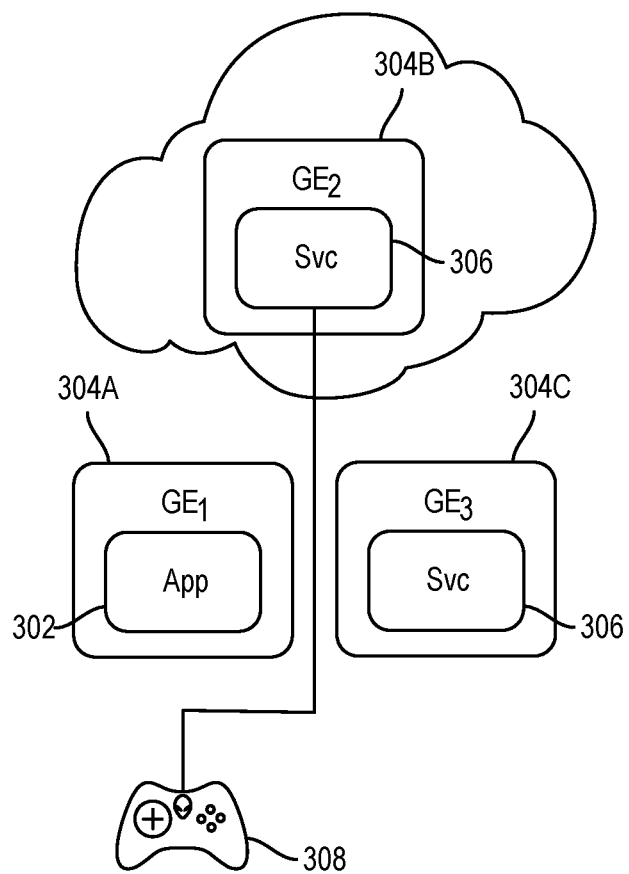
FIG. 3D is a block diagram illustrating a cloud-based service arrangement for a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, such as when the user's home includes the gaming environment 304B but the user is engaging with application 302 at a location on a different network from their home (e.g., at a friend's house). The service 306 may also or alternatively be executed, for example, on a cloud computing device available as a subscription service to the user.

Users may accordingly be able to utilize different computing services (such as gaming services) across different combinations of peripherals, I/O devices, displays, computing devices, and the like. I/O devices, which may conventionally be interacted with by contact or near field interaction, may follow a user as they move between different locations or rooms and thus as the user interacts with different computing devices. To ensure that a user, when interacting with an I/O device, is able to manipulate a desired computing device, it may accordingly be necessary to detect where the I/O device is, and which device should be controlled by inputs to the I/O device.

One solution to this problem is to use indicators, such as lighting indicators, that are visible on an exterior of the I/O device to indicate when computing devices are located near an I/O device. For example, lighting indicators may be displayed using a multi-element light loop on the I/O device and may point or otherwise be directed towards nearby computing devices. These lighting indicators may be updated as the I/O devices move, such as to continue pointing at corresponding computing devices. Based on the lighting indicators, a user may then point the I/O device towards a selected computing device to begin using the I/O device with the selected computing device.

Figure 4:
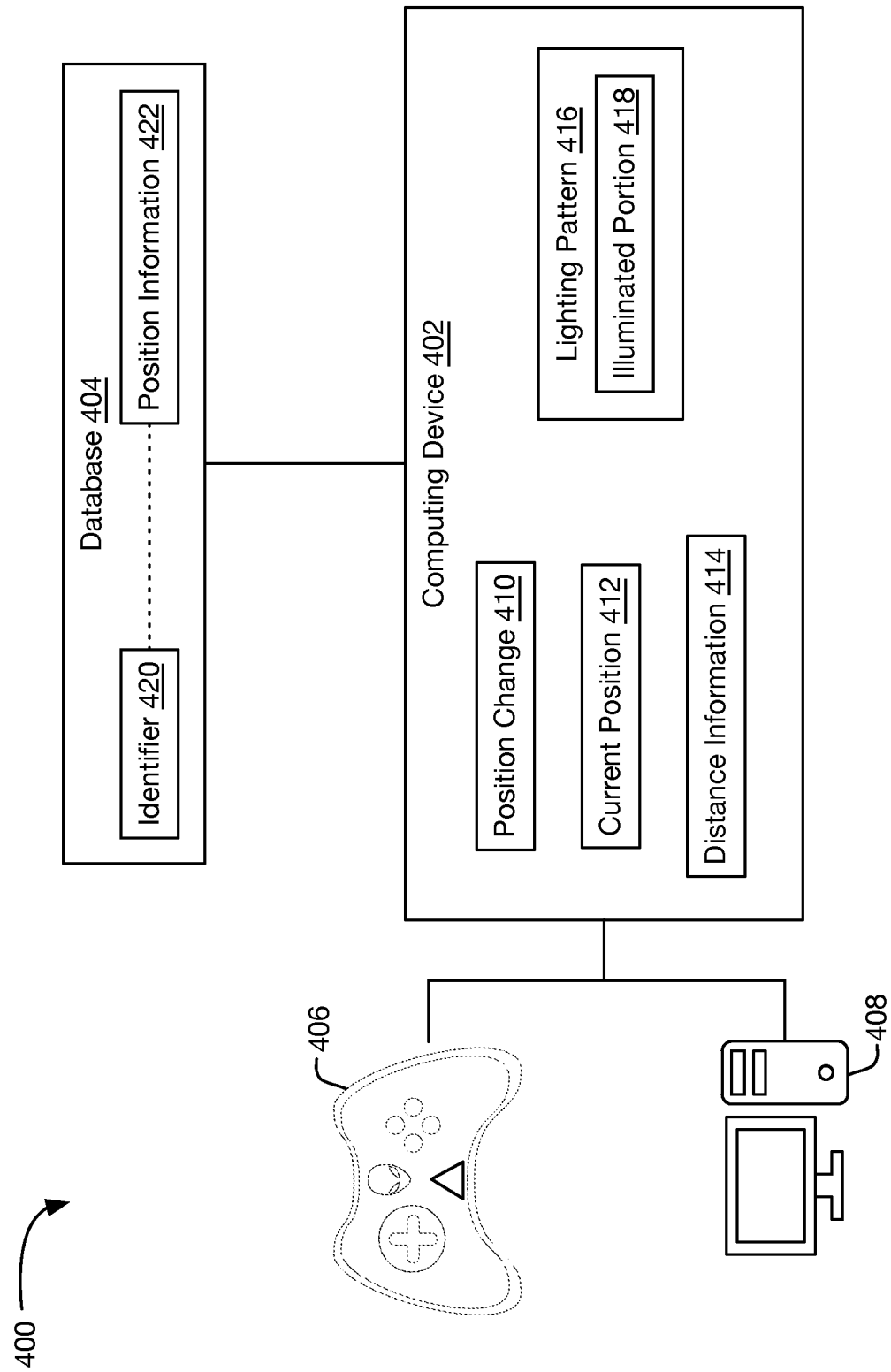
FIG. 4 is a system for displaying lighting indicators via an I/O device according to an exemplary embodiment of the present disclosure.

FIG. 4 depicts a block diagram of a system 400 for displaying location indicators via I/O devices according to an exemplary embodiment of the present disclosure. In particular, the system 400 may be configured to display location indicators via I/O devices located within one or more environments within a home, or other building or facility. The system 400 includes an I/O device 406, a computing device 402, a database 404, and a first computing device 408. The computing device 402 includes a position change 410, a current position 412, distance information

414, and a lighting pattern 416, which includes an illuminated portion 418. The database 404 includes an identifier 420 and position information 422.

In operation, the computing device 402 may be configured to detect a position change 410 for an I/O device 406. In certain implementations, the position change 410 may include movement of the I/O device 406, such as a physical relocation or other persistent change in the position of the I/O device 406. For example, an I/O device's 406 position may change when the I/O device 406 is picked up by a user (such as off of a table) for use by the user, when it is carried by the user into another room, or when the I/O device 406 is put down by the user at the end of use or to take a break. In certain instances, position changes 410 may be detected when a current position 412 of the I/O device 406 changes by more than a predetermined threshold (such as 1 foot, 5 feet, 10 feet, 20 feet). For example, the computing device 402 may be configured to regularly determine current positions 412 for the I/O device 406 (such as when the I/O device 406 is awake or in use). The computing device 402 may compare current positions 412 to previous positions, such as previous positions within a predetermined time period (e.g., within the last 1 minute, 5 minutes, 10 minutes), and may determine a position change 410 if a difference between a current position 412 and previous positions exceeds the predetermined threshold. In further implementations, the computing device 402 may be configured to determine a current room in which the I/O device 406 may be located (such as one or more preconfigured room locations within a home, building, or other facility). In such instances, a position change 410 may be detected when the I/O device 406 changes rooms. In certain implementations, detecting the position change 410 for the I/O device 406 includes determining that the current position 412 of the I/O device 406 has changed by more than a predetermined threshold.

In certain implementations, positions for the computing device 402 may be determined based on one or more wireless location determination processes. For example, the current position 412 may be determined based on a distance between the I/O device 406 and a plurality of location tags. In particular, and referring to FIG. 2, one or more location tags 210, 212, 214, 216 with known locations may be positioned in various rooms or other portions of a home, building, or other facility. In certain implementations, the computing device 402 may measure distance information 414 between the I/O device 406 and one or more location tags (such as a distance from the I/O device 406 and the location tags 210, 212, 214, 216) and may determine the location of the device based on differences in the distance between the location tags 210, 212, 214, 216. In particular, the location tags 210, 212, 214, 216 may have a known location, and the distances to the location tags 210, 212, 214, 216 may be used to triangulate the position of the I/O device 406. In certain implementations, the location tags 210, 212, 214, 216 may be implemented as ultra-wide band location tags 210, 212, 214, 216. In additional or alternative implementations, the location tags 210, 212, 214, 216 may be implemented using other wireless communication interfaces, such as radio frequency identification (RFID), Bluetooth Low Energy (BLE), WiFi, GPS, and the like.

In certain implementations, a position change 410 may include other types of device movement, such as bumping, jostling or otherwise changing the orientation of the I/O device 406 (temporarily or otherwise) without a persistent change in the position of the I/O device 406 (such as within a room, a home, building, or other facility). In such instances, the position change 410 may be detected using one or more movement sensors, such as accelerometers, gyroscopes, and the like.

In certain implementations, the I/O device 406 may be a device capable of sending and receiving information from one or more computing devices 408. For example, the I/O device 406 may be able to send control information (such as button presses, joystick commands), position information 422 (such as positioning or movement information as the I/O device 406 moves), biometric information (such as from one or more biometric scanners on the I/O device 406), and the like to one or more computing devices 408. The I/O device 406 may receive information from computing devices 408 as well, such as audio information, haptic feedback information, communication status information, and the like. In certain implementations, the I/O device 406 may be a wireless device, such as a device capable of wirelessly communicating with one or more computing devices 408 to send I/O data, receive I/O data, or combinations thereof. In certain implementations, the I/O device 406 may be a gaming controller configured to communicate with one or more gaming devices. In additional or alternative implementations, the I/O device 406 may be implemented as one or more of a peripheral device, a keyboard, a mouse, a tablet device, a virtual reality (VR) headset, a VR controller, a portable gaming console, and the like.

The computing device 402 may be configured to determine, based on a current position 412 of the I/O device 406, a first computing device 408 capable of communicating with the I/O device 406. For example, the computing device 402 may be configured to determining the current position 412 in response to detecting the position change 410 (such as before identifying the first computing device 408). In alternative implementations, the current position 412 may be determined as part of detecting the position change 410, as noted above.

In certain implementations, computing devices 408 capable of communicating with the I/O device 406 may include computing devices 408 that have been previously paired with the I/O device 406, computing devices 408 previously used with the I/O device 406, computing devices 408 associated with the same user account as the I/O device 406, or combinations thereof. In certain implementations, computing devices 408 capable of communicating with the I/O device 406 may be identified based on one or more communicative or other hardware capabilities of the I/O device 406. For example, computing devices 408 capable of communicating with the I/O device 406 may include computing devices 408 that are compatible with a wireless communication standard utilized by the I/O device 406 and/or one or more input devices or output devices included with the I/O device 406.

In certain implementations, determining the first computing device 408 may include querying a database 404 for a plurality of computing devices 408 capable of communicating with the I/O device 406 and identifying, from among the plurality of computing devices 408, the first computing device 408 as being located closest to the I/O device 406. The computing device 402 may transmit a request to a database 404 (such as over a network), and the database 404 may return identifiers 420 of computing devices 408 that are capable of communicating with the I/O device 406, along with position information 422 for the computing devices 408. In particular, the request may include an identifier 420 of the I/O device 406 or an account or user associated with the I/O device 406, and the database 404 may return identifiers 420 and position information 422 of associated computing devices 408. In certain implementations, the position information 422 may include one or more of location coordinates, an identifier of a room in which the computing device 408 is located, relative distances between the computing device 408 and one or more location tags 210, 212, 214, 216, and the like. The computing device 402 may then compare the current position 412 of the I/O device 406 to the position information 422 for the plurality of computing devices 408 to determine that the first computing device 408 is located closest to the I/O device 406. For example, the computing device 402 may compute, based on the received position information 422, distances between the I/O device 406 and corresponding computing devices 408 and may select the first computing device 408 as the closest computing device. As another example, the computing device 402 may identify all computing devices 408 located within the same room as the I/O device 406. In certain implementations, determining the first computing device 408 includes determining a plurality of computing devices 408 capable of communicating with the I/O device 406. In such instances, the plurality of computing devices 408 may include the first computing device 408. For example, the computing device 402 may identify all computing devices 408 located within the same room as the I/O device 406, or located within a predetermined threshold distance of the 406. As another example, the computing device 402 may identify a predetermined number (or a predetermined maximum number) of computing device 402 located within a predetermined threshold distance or the same room as the I/O device 406. The multiple computing devices 408 may further be identified to include one or more recent computing devices that the I/O device 406 was most frequently used with. In certain implementations, the computing devices 408 identified as capable of communicating with the I/O device 406 may include a personal computing device (such as a personal computer, a laptop computer, a tablet computer, a smartphone, and the like), a gaming device (such as a gaming console, a host device, a hub device, and the like), or any other type of computing device.

The computing device 402 may be configured to determine a first lighting pattern 416 based on a position of the first computing device 408 relative to the I/O device 406. The computing device 402 may also be configured to display the first lighting pattern 416 on an exterior lighting device 508 of the I/O device 406. Lighting patterns may include externally visible illumination of at least a portion of the I/O device 406. The lighting patterns 416 may include various lighting conditions, including lights of different colors, intensities, locations, blinking patterns, and the like. In particular, the lighting pattern 416 may be displayed on an exterior lighting device of the I/O device 406, such as one or more lights positioned on the exterior of the I/O device 406 or otherwise visible from the exterior of the I/O device 406. For example, the lighting pattern 416 may identify an illuminated portion 418 of the exterior lighting device to be illuminated according to the lighting pattern. In certain implementations, the illuminated portion 418 may be directed towards the first computing device 408. In certain implementations, lighting patterns 416 directed towards a computing device 402 may include lighting patterns 416 that include an illuminated portion 418 that points towards the computing device 408, such as an illuminated portion 418 positioned between a center of the I/O device 406 and the computing device 408. For example, the computing device 402 may determine a difference in position and orientation between the I/O device 406 and the computing devices 408 and may determine the first lighting pattern 416 to include an illuminated portion 418 of the exterior lighting device that faces the computing devices 408.

Figure 5A:
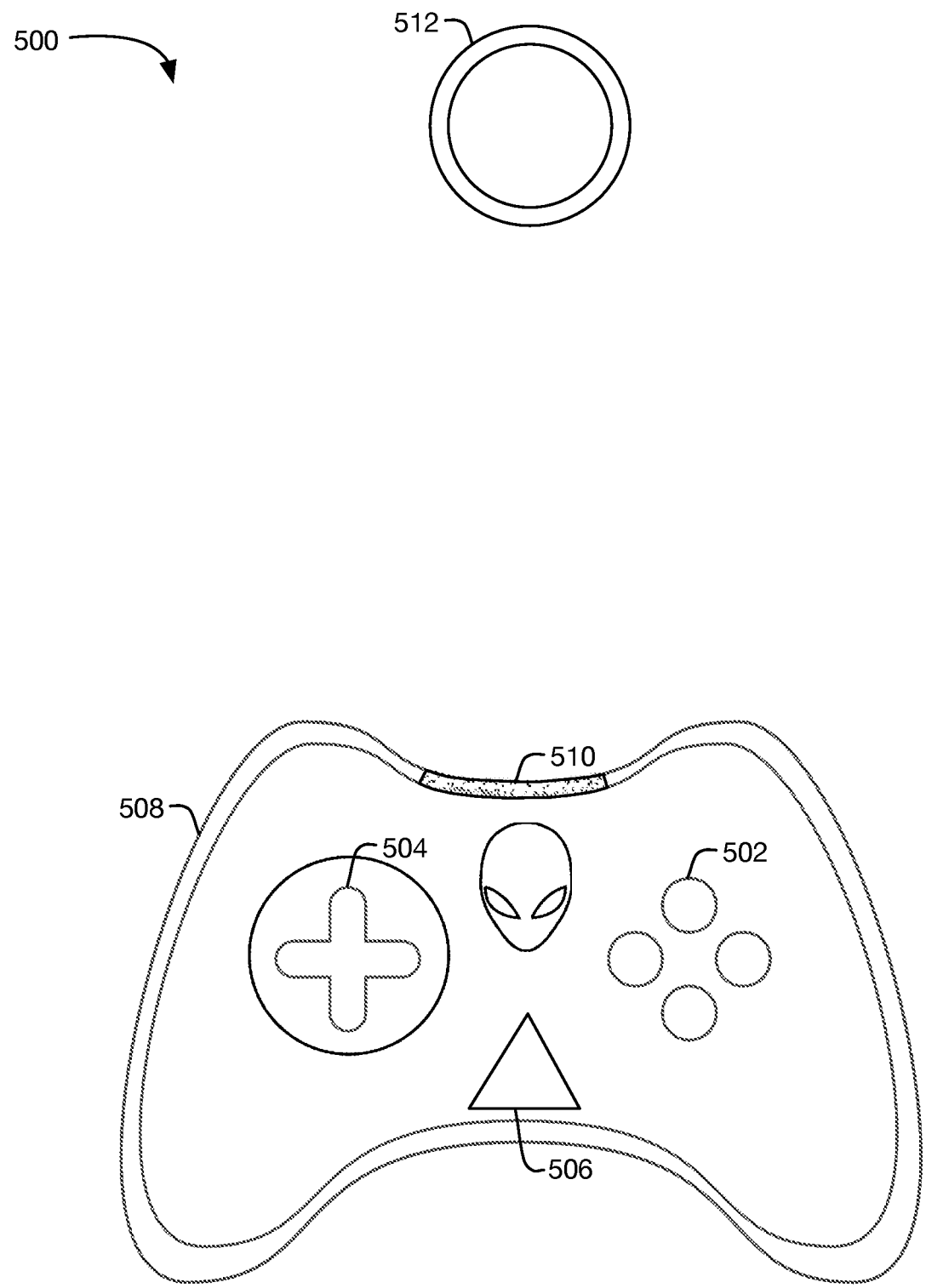
FIGS. 5A, 5B, and 5C depict scenarios for displaying lighting indicators via an I/O device according to exemplary embodiments of the present disclosure.

For example, FIG. 5A depicts a scenario 500 for displaying lighting indicators via an I/O device according to an exemplary embodiment of the present disclosure. In particular, the scenario 500 includes the I/O device 406, which is depicted as a gaming controller. The I/O device 406 includes input buttons 502, 504, a location sensor 506, and an exterior lighting device 508. The input buttons 502, 504 may be manipulated by a user to send commands to one or more computing devices 408. The location sensor 506 may be used to measure or otherwise determine a current position 412 for the I/O device 406. For example, the location sensor 506 may be a UWB antenna used to measure distances and relative orientations between the I/O device 406 and one or more location tags, such as the location tag 512. In particular, the location tag 512 may correspond to a computing device configured to communicate with the I/O device 406. For example, the location tag 512 may be enrolled or otherwise associated within the database 404 to indicate a known location of a computing device 408 (or a display connected to the computing device 408). The location sensor 506 may measure a relative orientation of the I/O device 406 to the 512, which may be represented or computed based on the current position 412. The I/O device 406 also includes an exterior lighting device 508, which may be an externally visible lighting device incorporated into the I/O device 406. For example, the exterior lighting device 508 may be implemented as a multi-element LED array around an outer surface of the I/O device 406. A lighting pattern 416 applied to the exterior lighting device 508 may cause an illuminated portion 510 of the exterior lighting device 508 to be illuminated in one or more colors, which may be visible to the user while holding or otherwise using the I/O device 406. In particular, the illuminated portion 510 may be directed towards the first computing device 408. For example, the illuminated portion 510 is positioned along the computing devices 408 between a center of the I/O device 406 and the location tag 512, representing the location of a computing device 408.

Figure 5B:
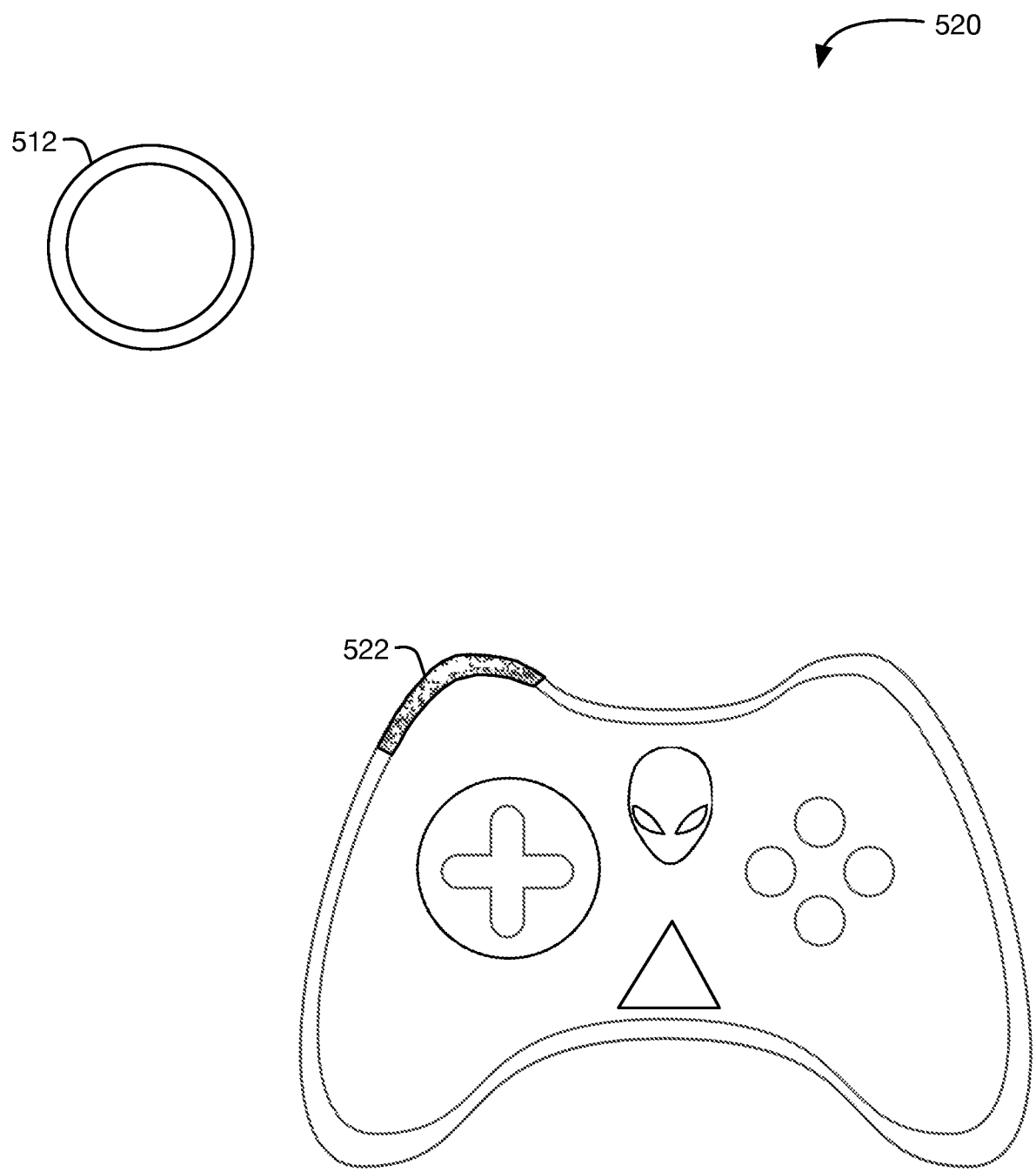

In certain implementations, the above-discussed techniques may be repeated to update the first lighting pattern 416 as the I/O device 406. In particular, the first lighting pattern 416 may be updated to keep the illuminated portion 418 directed towards the first computing device 408. For example, FIG. 5B depicts a scenario 520 in which the I/O device 406 has rotated relative to the location tag 512. The lighting pattern may accordingly be updated to move the illuminated portion 510 to a different portion of the I/O device 406. In particular, the updated lighting pattern has a different illuminated portion 522 on the top left of the controller, which faces the location tag 512 after the I/O device 406 has moved. Returning to FIG. 4, in certain implementations, the lighting pattern 416 may be generated to assist a user in identifying which computing device 402 is intended for use with the I/O device 406. Based on the lighting pattern 416, the user may move, rotate, or otherwise change the position and/or orientation of the I/O device 406. In such instances, as the I/O device 406 changes position or orientation relative to the first computing device 408 (or other computing devices), the corresponding first lighting pattern 416 (or other lighting patterns) may be updated (such as in real time) to continue identifying the position of the first computing device 408. In particular, an illuminated portion for the first lighting pattern 416 may be updated to continue pointing to the corresponding computing device 408. In certain implementations, other types of lighting patterns may update illuminated portions differently. For example, rather than pointing towards a computing device, the illuminated portion may correspond to a relative direction the I/O device 406 needs to rotate towards to point at the corresponding computing device (such as illuminating a left portion of the I/O device 406 to indicate a need to turn left and illuminating a right portion of the I/O device 406 to indicate a need to turn right).

Figure 5C:
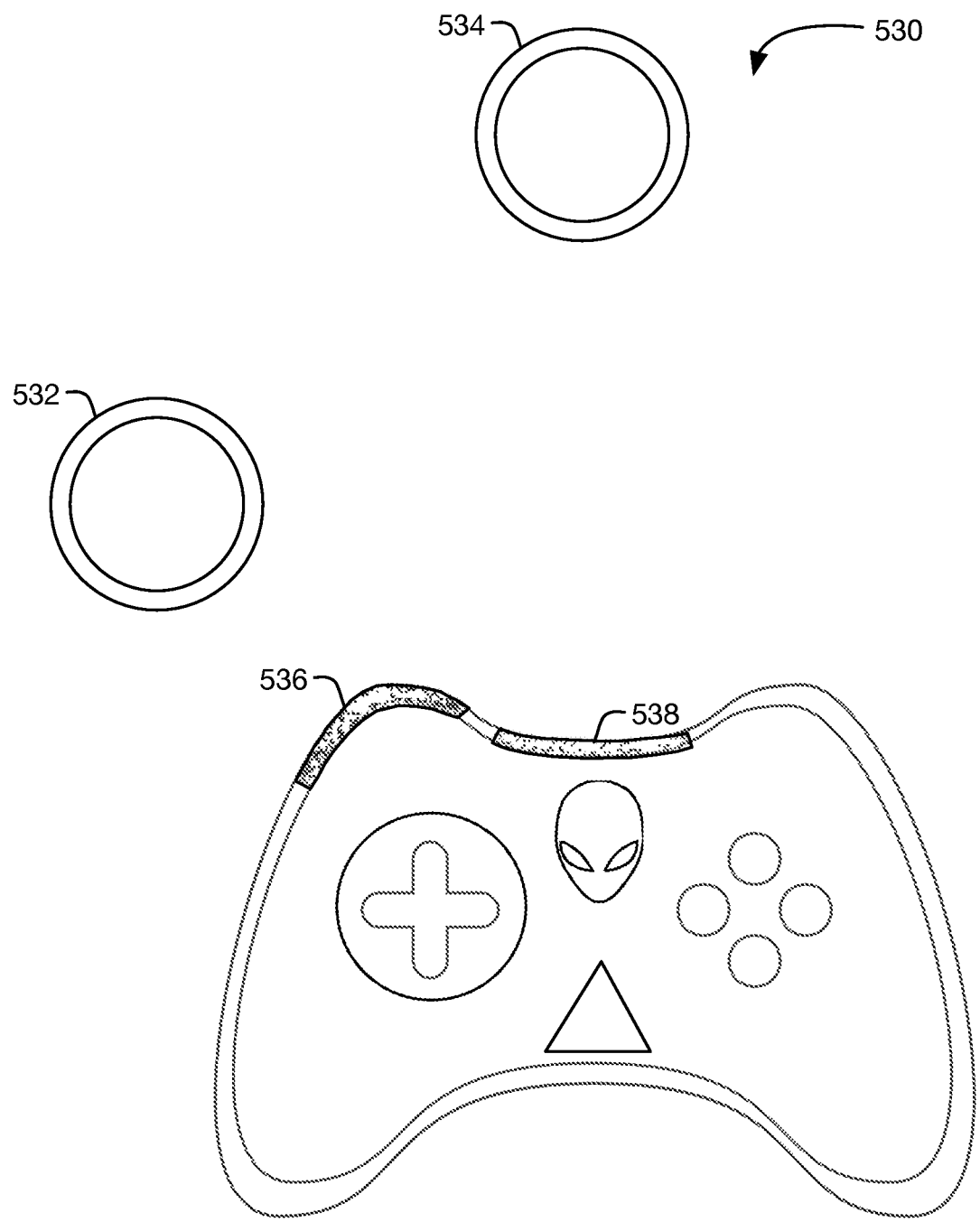

When the computing device 402 is configured to determine a plurality of computing devices capable of communicating with the I/O device 406, determining the first lighting pattern 416 may include determining, based on positions for the plurality of computing devices 408, a plurality of lighting patterns 416. In such instances, the plurality of lighting patterns 416 may include the first lighting pattern 416. For example, each of the selected plurality of computing devices may have a corresponding lighting pattern with a corresponding illuminated portion that points towards the respective computing device. As a specific example, FIG. 5C depicts a lighting scenario in which two location tags 532, 534, representative of two nearby computing devices, are identified. Each of the location tags 532, 534 has a corresponding lighting pattern with a corresponding illuminated portion 536, 538 on the controller 500. In particular, the illuminated portion 536 is directed towards location tag 532 and illuminated portion 538 is directed towards location tag 534.

In practice, multiple lighting patterns may be displayed via the I/O device 406, allowing the user to select between multiple computing devices without having to navigate a user interface (which may not be visible until the user has selected a corresponding computing device 408 for the I/O device 406). In certain such implementations, the multiple lighting patterns may have a different color to indicate the different computing devices. In certain instances, the lighting patterns may be used to select a computing device for use with the I/O device 406. For example, based on the lighting indicators, a user may then point the I/O device 406 towards a selected computing device to begin using the I/O device with the selected computing device. After being pointed towards the selected computing device for more than a predetermined time threshold (such as 1 second, 5 second, 10 seconds), the I/O device 406 may be communicatively paired with the selected computing device for use in controlling the selected computing device.

In certain implementations, additional lighting patterns may be displayed via the I/O device 406 separate from those used for corresponding computing devices. For example, the computing device 402 may be further configured to determine a second lighting pattern based on a first status of the I/O device 406, a second status of the first computing device 408, or combinations thereof. In certain implementations, statuses with corresponding lighting patterns 416 may include one or more of a battery status for the I/O device 406 or the computing device 408, a wireless communication signal level for the I/O device 406 or the computing device 408, an authentication result for the I/O device 406 or the computing device 408, a pairing result between the I/O device 406 and the computing device 408, a volume level for the I/O device 406 or the computing device 408, timer information (such as a countdown timer, a stopwatch, or combinations thereof), system notifications for the I/O device 406 or the computing device 408 (system notifications, game notifications, chat notifications, friend notifications, parental control notification, social notifications, or combinations thereof). As another example, additional lighting patterns may include flashing an exterior lighting device of the I/O device 406 to help locate a lost I/O device 406. In certain implementations, any of the above additional lighting patterns may be displayed on the I/O device 406 in combination with lighting patterns corresponding to computing devices configured to communicate with the I/O device 406. For example, the additional lighting patterns may be displayed on a bottom portion of the exterior lighting device (such as near the base of the controller), while the first lighting pattern 416 is displayed along a top portion of the controller (as shown in the scenarios 500, 520).

The locations of computing devices 408 may be determined based on an enrolling procedure for the computing devices. For example, the computing device 402 (or another computing device) may be configured to receiving a request to add a location tag corresponding to a second computing device, such as a second computing device configured to communicate with the I/O device 406. For example, the second computing device may be a gaming device connected to the same user account as the I/O device 406 and the first computing device 408. The computing device 402 may further receive position calibration information for the I/O device 406 corresponding to a display of the second computing device 402. For example, the computing device 402 may determine a global location for the location tag, such as by using one or more of the techniques discussed above for determining the position of the I/O device 406. However, the location tag may not be located in the same position as a display that a user will view while interacting with the second computing device. For example, the second computing device may be a gaming console connected to a TV, but may be offset to one side of the TV (such as by 3 or more feet). Accordingly, a location tag positioned within or near the second computing device will not directly indicate the position of the display. To determine the position calibration information, the user may be prompted to point the I/O device 406 at the display from one or more locations. Position calibration information including distances and orientations of the I/O device 406 relative to the display may be computed, such as based on one or more UWB position and orientation measurements. A position offset may then be determined for the location tag 512 based on the position calibration information. In particular, the position offset may be computed to indicate a distance and/or orientation of the display relative to second computing device (such as relative to the location tag). Information regarding the second computing device may then be stored in the database 404. For example, the computing device 402 may transmit an identifier of the second computing device, an identifier of the location tag, position information for the location tag, the position offset, or combinations thereof to the database 404 for storage. The position offset may then be used to determine corresponding lighting patterns to enable a user to identify the second computing device and its display for future use. For example, the position offset may be applied to the position information for the location tag when determining where the illuminated portion for a corresponding lighting pattern should be positioned on the I/O device 406. In particular, the illuminated portion may be determined such that the illuminated portion points to an offset position computed by applying the position offset to the location tag's position, rather than pointing to the location tag.

In certain implementations, one skilled in the art should appreciate that the computing device 402 may be implemented as various types of computing devices 408. In certain implementations, the computing device 402 may be implemented as the I/O device 406 itself. For example, the I/O device 406 may locally identify nearby computing devices 408 to determine, display, and update the lighting pattern 416. In additional or alternative implementations, the computing device 402 may be implemented as another computing device 402, such as a host device, hub device, or other computing device 402 located in the same building or same room as the I/O device 406. For example, a host device, hub device, or other local computing device may implement one or more of a lighting effect service, a content telemetry service, and/or a device context controller service to implement one or more of the above-described operations. In such instances, communication between the computing device 402 and the I/O device 406 may occur via a network, such as a local network. In still further implementations, the computing device 402 may be implemented at least in part by one or more computing devices 408 geographically separated from the I/O device 406, and the computing device 402 may communicate with the I/O device 406 over a network, such as a global network.

As noted above, one or more of the computing devices 402, 408, the database 404, and the I/O device 406 may be configured to communicate using a network. In particular, one or more of the discussed networks may be implemented as a local network (e.g., a local area network), a virtual private network, L1, and/or a global network (e.g., the Internet). The computing devices 402, 408, the database 404, and/or the I/O device 406 may communicate with the network using a wired network interface, a wireless network interface, or combinations thereof.

The computing devices 402, 408, the database 404, and/or the I/O device 406 may also include processors and memories (not depicted). The processors and memories may implement one or more aspects of the computing devices 402, 408, the database 404, and/or the I/O device 406. For example, the memories may store instructions which, when executed by the processors, may cause the processors to perform one or more operational features of the computing devices 402, 408, the database 404, and/or the I/O device 406. The processors may be implemented as one or more central processing units (CPUs), field programmable gate arrays (FPGAs), and/or graphics processing units (GPUs) configured to execute instructions stored on the memory.

Figure 6:
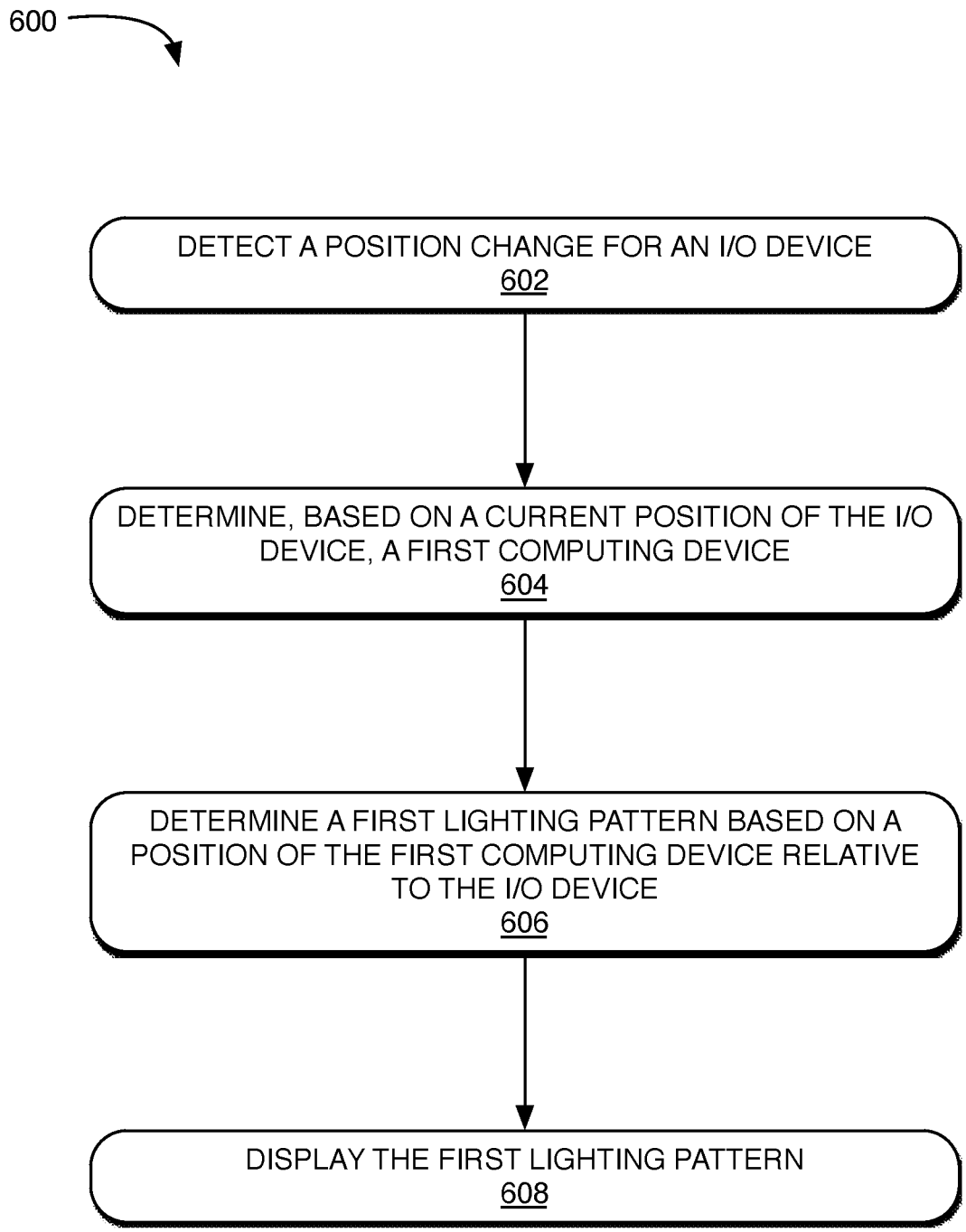
FIG. 6 depicts a method for displaying location indicators via I/O devices according to an exemplary embodiment of the present disclosure.

FIG. 6 depicts a method 600 for displaying location indicators via I/O devices according to an exemplary embodiment of the present disclosure. The method 600 may be implemented on a computer system, such as the system 400. For example, the method 600 may be implemented by the computing device 402. The method 600 may also be implemented by a set of instructions stored on a computer readable medium that, when executed by a processor, cause the computing device to perform the method 600. Although the examples below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks may be optional.

The method 600 includes detecting a position change for an I/O device (block 602). For example, the computing device 402 may detect a position change 410 for an I/O device 406. In certain implementations, the position change 410 may include movement of the I/O device 406, such as a physical relocation or other persistent change in the position of the I/O device 406. In certain instances, position changes 410 may be detected when the I/O device's 406 position changes 410 by more than a predetermined threshold. For example, the computing device 402 may be configured to regularly determine updated positions for the I/O device 406. The computing device 402 may compare current positions 412 to previous positions and may determine a position change 410 if a difference between a current position 412 and previous positions exceeds the predetermined threshold. In further implementations, a position change 410 may be detected when the I/O device 406 changes rooms. In certain implementations, positions for the computing device 402 may be determined based on one or more wireless location determination processes. In certain implementations, the current position 412 may be determined based on a distance between the I/O device 406 and a plurality of location tags 210, 212, 214, 216. In certain implementations, the location tags 210, 212, 214, 216 are ultra-wide band location tags 210, 212, 214, 216. In certain implementations, the I/O device 406 may be a device capable of sending and receiving information from one or more computing devices 408.

The method 600 includes determining, based on a current position of the I/O device, a first computing device capable of communicating with the I/O device (block 604). For example, the computing device 402 may determine, based on a current position 412 of the I/O device 406, a first computing device 408 capable of communicating with the I/O device 406. In certain implementations, before determining the first computing device 408, the method 600 may include determining the current position 412 in response to detecting the position change 410. In further implementations, the current position 412 may be determined as part of detecting the position change 410. For example, the computing device 402 may be configured to regularly determine updated, current position information 422 for the I/O device 406. In certain implementations, determining the first computing device 408 includes querying a database 404 for a plurality of computing devices 408 capable of communicating with the I/O device 406 and identifying, from among the plurality of computing devices 408, the first computing device 408 as being located closest to the I/O device 406. In certain implementations, the computing device 402 may compare a current position 412 of the I/O device 406 to position information 422 for the plurality of computing devices 408 to determine that the first computing device 408 may be located closest. In certain implementations, determining the first computing device 408 includes determining a plurality of computing devices capable of communicating with the I/O device 406, and the plurality of computing devices may include the first computing device 408. For example, the plurality computing devices 408 may be identified as all computing devices configured to communicate with the I/O device 406 and located within a predetermined distance threshold of the I/O device 406. As another example, the computing device 402 may identify a predetermined number (or a predetermined maximum number) of computing devices located near the I/O device 406 that are capable of communicating with the I/O device 406. The multiple computing device may further be identified to include one or more recent computing devices that the I/O device 406 was most frequently used with.

The method 600 includes determining a first lighting pattern based on a position of the first computing device relative to the I/O device (block 606). For example, the computing device 402 may determine a first lighting pattern 416 based on a position of the first computing device 408 relative to the I/O device 406. In certain implementations, lighting patterns may include any user-visible illumination of at least a portion of the I/O device 406. In particular, the lighting pattern 416 may be displayed on an exterior lighting device 508 of the I/O device 406, such as one or more lights positioned on the exterior of the I/O device 406 or otherwise visible from the exterior of the I/O device 406. In certain implementations, the first lighting pattern 416 may include an illuminated portion 418 directed towards the first computing device 408. In certain implementations, lighting patterns 416 directed towards a computing device 402 may include lighting patterns 416 that include an illuminated portion 418 that points towards the computing device 408, such as an illuminated portion 418 positioned between a center of the I/O device 406 and the computing device 408. In implementations where a plurality of computing devices are determined at block 606, determining the first lighting pattern 416 may include determining, based on positions for the plurality of computing devices 408, a plurality of lighting patterns 416. In such instances, the plurality of lighting patterns 416 may include the first lighting pattern 416. For example, the computing device 402 may determine a corresponding lighting pattern for each of at least a subset of the plurality of computing devices 408.

The method 600 includes displaying the first lighting pattern 416 on an exterior lighting device 508 of the I/O device 406. (block 608). For example, the computing device 402 may display the first lighting pattern 416 on an exterior lighting device 508 of the I/O device 406. In implementations where the computing device 402 determines a plurality of lighting patterns, displaying the first lighting pattern 416 may include displaying at least a subset of the plurality of lighting patterns, such as by displaying, via the exterior lighting device, a plurality of illuminated portions corresponding to the at least a subset of the plurality of lighting patterns.

In certain implementations, the method 600 may be repeated to update the first lighting pattern 416 as the I/O device 406 moves to keep the illuminated portions directed towards corresponding computing devices. In certain implementations, the method 600 may further include determining a second lighting pattern 416 based on a first status of the I/O device 406, a second status of the first computing device 408, or combinations thereof. In still further implementations, the method 600 may include receiving a request to add a location tag 512 corresponding to a second computing device 402, receiving position calibration information for the I/O device 406 corresponding to a display of the second computing device 402, determining, based on the position calibration information, a position offset for the location tag 512 relative to the display of the second computing device, and storing the position offset with an identifier 420 of the second computing device 402.

Figure 7:
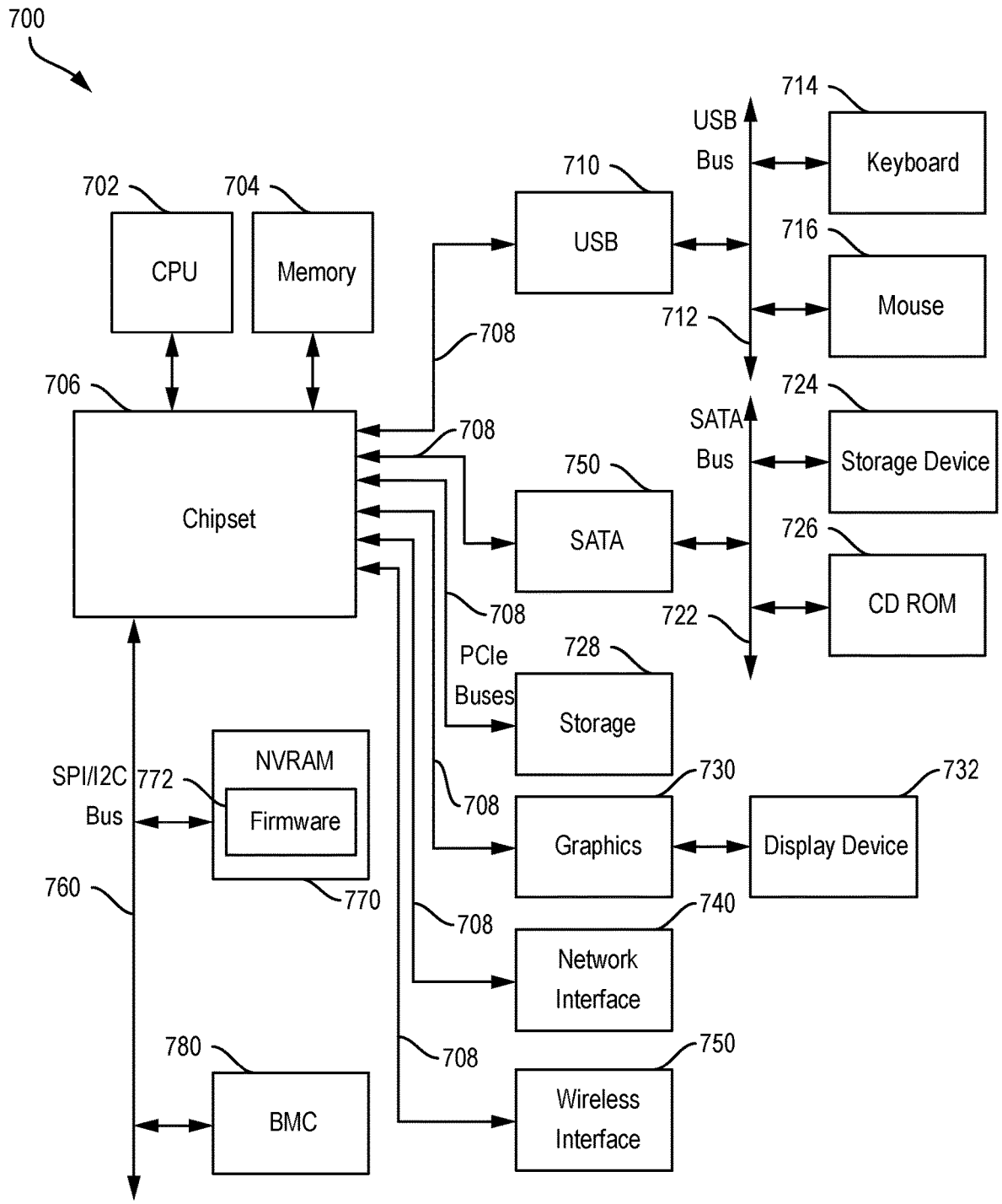
FIG. 7 illustrates an information handling system according to an exemplary embodiment of the present disclosure.

FIG. 7 illustrates an example information handling system 700. Information handling system 700 may include a processor 702 (e.g., a central processing unit (CPU)), a memory (e.g., a dynamic random-access memory (DRAM)) 704, and a chipset 706. In some embodiments, one or more of the processor 702, the memory 704, and the chipset 706 may be included on a motherboard (also referred to as a mainboard), which is a printed circuit board (PCB) with embedded conductors organized as transmission lines between the processor 702, the memory 704, the chipset 706, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 702, the memory 704, the chipset 706, and/or other components may be organized as a System on Chip (SoC).

The processor 702 may execute program code by accessing instructions loaded into memory 704 from a storage device, executing the instructions to operate on data also loaded into memory 704 from a storage device, and generate output data that is stored back into memory 704 or sent to another component. The processor 702 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 702 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 706 may facilitate the transfer of data between the processor 702, the memory 704, and other components. In some embodiments, chipset 706 may include two or more integrated circuits (ICs), such as a northbridge controller coupled to the processor 702, the memory 704, and a southbridge controller, with the southbridge controller coupled to the other components such as USB 710, SATA 720, and PCIe buses 708. The chipset 706 may couple to other components through one or more PCIe buses 708.

Some components may be coupled to one bus line of the PCIe buses 708, whereas some components may be coupled to more than one bus line of the PCIe buses 708. One example component is a universal serial bus (USB) controller 710, which interfaces the chipset 706 to a USB bus 712. A USB bus 712 may couple input/output components such as a keyboard 714 and a mouse 716, but also other components such as USB flash drives, or another information handling system. Another example component is a SATA bus controller 720, which couples the chipset 706 to a SATA bus 722. The SATA bus 722 may facilitate efficient transfer of data between the chipset 706 and components coupled to the chipset 706 and a storage device 724 (e.g., a hard disk drive (HDD) or solid-state disk drive (SDD)) and/or a compact disc read-only memory (CD-ROM) 726. The PCIe bus 708 may also couple the chipset 706 directly to a storage device 728 (e.g., a solid-state disk drive (SDD)). A further example of an example component is a graphics device 730 (e.g., a graphics processing unit (GPU)) for generating output to a display device 732, a network interface controller (NIC) 740, and/or a wireless interface 750 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 706 may also be coupled to a serial peripheral interface (SPI) and/or Inter-Integrated Circuit (I2C) bus 760, which couples the chipset 706 to system management components. For example, a non-volatile random-access memory (NVRAM) 770 for storing firmware 772 may be coupled to the bus 760. As another example, a controller, such as a baseboard management controller (BMC) 780, may be coupled to the chipset 706 through the bus 760. BMC 780 may be referred to as a service processor or embedded controller (EC). Capabilities and functions provided by BMC 780 may vary considerably based on the type of information handling system. For example, the term baseboard management system may be used to describe an embedded processor included at a server, while an embedded controller may be found in a consumer-level device. As disclosed herein, BMC 780 represents a processing device different from processor 702, which provides various management functions for information handling system 700. For example, an embedded controller may be responsible for power management, cooling management, and the like. An embedded controller included at a data storage system may be referred to as a storage enclosure processor or a chassis processor.

System 700 may include additional processors that are configured to provide localized or specific control functions, such as a battery management controller. Bus 760 can include one or more busses, including a Serial Peripheral Interface (SPI) bus, an Inter-Integrated Circuit (I2C) bus, a system management bus (SMBUS), a power management bus (PMBUS), or the like. BMC 780 may be configured to provide out-of-band access to devices at information handling system 700. Out-of-band access in the context of the bus 760 may refer to operations performed prior to execution of firmware 772 by processor 702 to initialize operation of system 700.

Firmware 772 may include instructions executable by processor 702 to initialize and test the hardware components of system 700. For example, the instructions may cause the processor 702 to execute a power-on self-test (POST). The instructions may further cause the processor 702 to load a boot loader or an operating system (OS) from a mass storage device. Firmware 772 additionally may provide an abstraction layer for the hardware, such as a consistent way for application programs and operating systems to interact with the keyboard, display, and other input/output devices. When power is first applied to information handling system 700, the system may begin a sequence of initialization procedures, such as a boot procedure or a secure boot procedure. During the initialization sequence, also referred to as a boot sequence, components of system 700 may be configured and enabled for operation and device drivers may be installed. Device drivers may provide an interface through which other components of the system 700 can communicate with a corresponding device. The firmware 772 may include a basic input-output system (BIOS) and/or include a unified extensible firmware interface (UEFI). Firmware 772 may also include one or more firmware modules of the information handling system. Additionally, configuration settings for the firmware 772 and firmware of the information handling system 700 may be stored in the NVRAM 770. NVRAM 770 may, for example, be a non-volatile firmware memory of the information handling system 700 and may store a firmware memory map namespace of the information handling system 700. NVRAM 770 may further store one or more container-specific firmware memory map namespaces for one or more containers concurrently executed by the information handling system.

Information handling system 700 may include additional components and additional busses, not shown for clarity. For example, system 700 may include multiple processor cores (either within processor 702 or separately coupled to the chipset 706 or through the PCIe buses 708), audio devices (such as may be coupled to the chipset 706 through one of the PCIe busses 708), or the like. While a particular arrangement of bus technologies and interconnections is illustrated for the purpose of example, one of skill will appreciate that the techniques disclosed herein are applicable to other system architectures. System 700 may include multiple processors and/or redundant bus controllers. In some embodiments, one or more components may be integrated together in an integrated circuit (IC), which is circuitry built on a common substrate. For example, portions of chipset 706 can be integrated within processor 702. Additional components of information handling system 700 may include one or more storage devices that may store machine-executable code, one or more communications ports for communicating with external devices, and various input and output (I/O) devices, such as a keyboard, a mouse, and a video display.

In some embodiments, processor 702 may include multiple processors, such as multiple processing cores for parallel processing by the information handling system 700. For example, the information handling system 700 may include a server comprising multiple processors for parallel processing. In some embodiments, the information handling system 700 may support virtual machine (VM) operation, with multiple virtualized instances of one or more operating systems executed in parallel by the information handling system 700. For example, resources, such as processors or processing cores of the information handling system may be assigned to multiple containerized instances of one or more operating systems of the information handling system 700 executed in parallel. A container may, for example, be a virtual machine executed by the information handling system 700 for execution of an instance of an operating system by the information handling system 700. Thus, for example, multiple users may remotely connect to the information handling system 700, such as in a cloud computing configuration, to utilize resources of the information handling system 700, such as memory, processors, and other hardware, firmware, and software capabilities of the information handling system 700. Parallel execution of multiple containers by the information handling system 700 may allow the information handling system 700 to execute tasks for multiple users in parallel secure virtual environments.

The schematic or flow chart diagrams of FIG. 6 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
    detecting a position change for an I/O device;
    determining, based on a current position of the I/O device, one or more nearby computing devices capable of communicating with the I/O device;
    determining a first lighting pattern based on positions of the one or more nearby computing devices relative to the I/O device;
    displaying the first lighting pattern on an exterior lighting device of the I/O device;
    receiving a request to add a location tag corresponding to a second computing device;
    receiving position calibration information for the I/O device corresponding to a display of the second computing device;
    determining, based on the position calibration information, a position offset for the location tag relative to the display of the second computing device; and
    storing the position offset with an identifier of the second computing device.

2. The method of claim 1, wherein determining the one or more nearby computing devices comprises:
    querying a database for a plurality of computing devices capable of communicating with the I/O device; and
    identifying, from among the plurality of computing devices, the one or more computing devices as being located near the I/O device.

3. The method of claim 1, wherein the first lighting pattern includes at least one illuminated portion directed towards the one or more nearby computing devices.

4. The method of claim 3, wherein the method is repeated to update the first lighting pattern as the I/O device moves to keep the at least one illuminated portion directed towards the one or more nearby computing devices.

5. The method of claim 1, wherein determining the one or more nearby computing devices comprises determining a plurality of computing devices capable of communicating with the I/O device, wherein determining the first lighting pattern comprises determining, based on positions for the plurality of computing devices, a plurality of lighting patterns, wherein the plurality of computing devices includes the one or more nearby computing devices, and wherein the plurality of lighting patterns includes the first lighting pattern.

6. The method of claim 1, wherein the current position is determined based on a distance between the I/O device and a plurality of location tags.

7. The method of claim 6, wherein at least a subset of the plurality of location tags are ultra-wide band tags.

8. The method of claim 1, wherein detecting the position change for the I/O device comprises: determining that the current position of the I/O device has changed by more than a predetermined threshold.

9. The method of claim 1 wherein the I/O device is a gaming controller and the one or more nearby computing devices is a gaming device.

10. An information handling system, comprising:
    a memory; and
    a processor coupled to the memory, wherein the processor is configured to perform operations comprising:
        detecting a position change for an I/O device;
        determining, based on a current position of the I/O device, one or more nearby computing device capable of communicating with the I/O device;
        determining a first lighting pattern based on positions of the one or more nearby computing devices relative to the I/O device;
        displaying the first lighting pattern on an exterior lighting device of the I/O device;
        receiving a request to add a location tag corresponding to a second computing device;

receiving position calibration information for the I/O device corresponding to a display of the second computing device;

determining, based on the position calibration information, a position offset for the location tag relative to the display of the second computing device; and storing the position offset with an identifier of the second computing device.

11. The information handling system of claim 10, wherein determining the one or more nearby computing devices comprises:

querying a database for a plurality of computing devices capable of communicating with the I/O device; and identifying, from among the plurality of computing devices, the one or more nearby computing devices as being located near the I/O device.

12. The information handling system of claim 10, wherein the first lighting pattern includes at least one illuminated portion directed towards the one or more nearby computing devices.

13. The information handling system of claim 12, wherein the operations are repeated to update the first lighting pattern as the I/O device moves to keep the at least one illuminated portion directed towards the one or more nearby computing devices.

14. A non-transitory, computer-readable medium storing instructions which, when executed by a processor, cause the processor to perform operations comprising:

detecting a position change for an I/O device;

determining, based on a current position of the I/O device, one or more nearby computing devices capable of communicating with the I/O device;

determining a first lighting pattern based on a position of the one or more nearby computing devices relative to the I/O device;

displaying the first lighting pattern on an exterior lighting device of the I/O device;

receiving a request to add a location tag corresponding to a second computing device;

receiving position calibration information for the I/O device corresponding to a display of the second computing device;

determining, based on the position calibration information, a position offset for the location tag relative to the display of the second computing device; and storing the position offset with an identifier of the second computing device.

15. The non-transitory, computer-readable medium of claim 14, wherein determining the one or more nearby computing devices comprises:

querying a database for a plurality of computing devices capable of communicating with the I/O device; and identifying, from among the plurality of computing devices, the one or more nearby computing devices as being located near the I/O device.

16. The non-transitory, computer-readable medium of claim 14, wherein the first lighting pattern includes at least one illuminated portion directed towards the one or more nearby computing devices.

17. The non-transitory, computer-readable medium of claim 16, wherein the instructions further cause the processor to repeat the operations to update the first lighting pattern as the I/O device moves to keep the illuminated portion directed towards the one or more nearby computing devices.

18. The method of claim 1, wherein the position change comprises a change in orientation of the I/O device, and wherein the position change is detected using one or more movement sensors.

19. The information handling system of claim 10, wherein the position change comprises a change in orientation of the I/O device, and wherein the position change is detected using one or more movement sensors.

20. The non-transitory, computer-readable medium of claim 14, wherein the position change comprises a change in orientation of the I/O device, and wherein the position change is detected using one or more movement sensors.

* * * * *